United States Patent [19]

Divisek et al.

[11] 4,356,231

[45] Oct. 26, 1982

[54] POROUS OXIDE DIAPHRAGM FOR ALKALINE ELECTROLYSES, AND MANUFACTURE THEREOF

[75] Inventors: Jiri Divisek; Heinrich Schmitz, both of Jülich; Renke Hesse, Aachen, all of Fed. Rep. of Germany

[73] Assignee: Kernforschungsanlage Jülich Gesellschaft mit beschrankter Haftung, Jülich, Fed. Rep. of Germany

[21] Appl. No.: 286,690

[22] Filed: Jul. 24, 1981

[30] Foreign Application Priority Data

Aug. 16, 1980 [DE] Fed. Rep. of Germany ....... 3031064

[51] Int. Cl.³ .............................................. B32B 15/02
[52] U.S. Cl. .................................. 428/304.4; 427/180; 428/242; 428/316.6; 428/317.9; 428/328; 428/329; 428/469; 428/472
[58] Field of Search ................... 428/304.4, 242, 316.6, 428/317.9, 328, 329, 469, 472; 427/180

[56] References Cited

U.S. PATENT DOCUMENTS

| | | | |
|---|---|---|---|
| 4,035,545 | 7/1977 | Ivanov et al. | 428/328 |
| 4,128,138 | 12/1978 | Ishii et al. | 428/328 |
| 4,129,195 | 12/1978 | Ishii et al. | 428/328 |
| 4,194,040 | 3/1980 | Breton et al. | 428/328 |
| 4,247,589 | 1/1981 | Greenspan | 428/472 |
| 4,292,357 | 9/1981 | Erisman et al. | 428/328 |

*Primary Examiner*—William J. Van Balen
*Attorney, Agent, or Firm*—Scully, Scott, Murphy & Presser

[57] ABSTRACT

A porous oxide diaphragm for alkaline electrolysis, in particular water electrolysis, consisting of an in situ oxidized metal powder layer applied onto a permeable framework-forming carrier without heat treatment before oxidation, as well as a process for the manufacture thereof and its utilization.

12 Claims, 4 Drawing Figures

POROUS OXIDE DIAPHRAGM FOR ALKALINE ELECTROLYSES, AND MANUFACTURE THEREOF

BACKGROUND OF THE INVENTION

1. Field of the Invention

The present invention relates to a porous oxide diaphragm for alkaline electrolysis, in particular water electrolysis, consisting of a metal layer oxidizable onto a permeable framework-forming carrier, as well as a process for the manufacture thereof and its utilization.

The alkaline water electrolysis is, in general, effectuated in hot KOH due to the relatively low chemical resistance of the applied diaphragm materials, such as asbestos, ordinarily at temperatures below 100° C. Such relatively low temperatures are disadvantageous thermodynamically as well as electrode-kinetically. Due to this reason, in the most recent time, numerous attempts have been undertaken to replace asbestos as the diaphragm material.

2. Discussion of the Prior Art

Accordingly, the Energy Research Corporation has developed a diaphragm of Teflon-bonded potassium hexatitanate felt ($K_2Ti_6O_{13}$), which is durable up to 150° C. This diaphragm is, however, not economical in price since expensive materials must be utilized, and the thereby occasioned voltage dropoff is comparable to that of asbestos diaphragms (refer also to M. S. Casper, "Hydrogen Manufacture by Electrolysis, Thermal Decomposition and Unusual Techniques", Noyes Data Corp., Park Ridge, 1978, page 190). In the Int. J. Hydrogen Energy 5, (1980), pages 165 to 171, there is described another separator for alkaline water electrolyses which consists of Teflon-bonded polyantimonic acid, which acts as an ion exchanger. This membrane is also durable up to 150° C. in KOH. The essential disadvantages of this separator, besides the high price, is the electrical membrane resistance of 0.7 to 0.9 $\Omega$ cm² at room temperature, and of 0.25 to 0.4 $\Omega$ cm² at 80 to 90° C.

Consequently, further diaphragms were developed having a lower electrical resistance such as, for example, a diaphragm produced of sintered oxide ceramic (J. Fischer, H. Hofmann, G. Luft, H. Wendt: Seminar "Hydrogen as Energy Vector", Commission Europ. Comm., 3-4 Oct. 1978, Brussels, pages 277-290). Thusly, this diaphragm distinguishes itself through extremely good resistance values (0.027 to 0.27 $\Omega$ cm² at 25°), however, the manufacture is not simple and encompasses:

(i) the production of the suitable oxide material, such as $ZrO_2$, $BaTiO_3$, $K_2Ti_6O_{13}$, and soforth, and (II) a sintering together of the powder at high temperatures of from between 1300°-1700° C.

Furthermore, there have been proposed porous metallic diaphragms of sintered nickel (P. Perroud, G. Terrier: "Hydrogen Energy System," Proc. 2nd World Hydrogen Energy Conf., Zurich 1978, page 241). These have an extremely low resistance. They are mechanically stable and inexpensive. The great disadvantage, however above all consists in that these diaphragms, as well as the electrodes, are electron-conductive, and for a compact construction there is present an excessive threat of danger of shortcircuiting.

In order to avoid this disruptive capacity for electron conductivity, the present applicant has proposed in an earlier patent application (German Patent Application P 29 27 566.9-41 filed July 7, 1979) to oxidize such porous sintered structures at an elevated temperature. Surprisingly, during such an oxidation the porous structure and a sufficient adhesion of the material remains intact. This method delivers diaphragms with an excellent corrosion resistance in hot KOH up to 150° C., and extremely good diaphragm resistance values of between 0.06 and 0.08 $\Omega$ cm² at 20° C.

It had now been found that such oxidized-on porous diaphragms produced by proceeding from a metal powder under the formation of a porous preform can be obtained more simply and better when the metal powder is not sintered together but merely combined or shaped into a powder layer.

SUMMARY OF THE INVENTION

The inventive diaphragm of the above-mentioned type is thusly characterized by a matrix of an oxidized thereon layer formed by oxidized metal powder particles, united and fixed by mutually penetrating oxide layers formed through oxidation in situ.

In this method and manner there is thus obviated a thermal treatment, in essence, a sintering compacting, and during the oxidation of the metal powder layer there is achieved an improved uniform oxygen permeation of the still not baked together powder granules which can produce a completely oxidized product, and which can be of advantage particularly for relatively thin-layered diaphragms.

The metal powder layer which is to be oxidized on is obtained particularly through cold compacting of the metal powder, which can in a usual manner be effected through vibration compacting, spraying of powder or powder suspension or through aspiration procedures; preferably, however the powder is cold-pressed under pressures of between 0.01 and 20 t/cm², and preferably 0.1 to 1.0 t/cm².

As metals there are particularly applicable iron, nickel and copper, which can be utilized in commercially available granule sizes. The granule size of the material determines the finally obtained porosity, whereby usually pores are sought in sizes of below 10 $\mu$m which afford a good separation between the anode and cathode space. Larger pores provide a lower resistance but a poorer separation. At median grain sizes of 2 to 3 $\mu$m there are obtained extraordinarily satisfying results. Too fine grain sizes reduce the diaphragm effect so that materials which are below 0.5 $\mu$m are not preferred.

For the porosity of the finally obtained diaphragm in the case of a pressure compacting of the powder, significant is the compacting pressure besides the grain size and grain size distribution, which is so selected that compacted members are obtained with a maximum pore size of about 100 $\mu$m. When operating with median grain or granule sizes of from 2 to 3 $\mu$m and carbonyl nickel powder under compacting pressures of about 0.1 to 1.0 t/cm², there were obtained suitable compactings. Pressures of below 0.01 t/cm² usually would not be sufficient for the desired pressure compacting, whereas pressures above 20 t/cm² demand a requirement for apparatus which is cumbersome in size.

Independently of the type of compacting or shaping (through vibration, painting or spraying on of powder, aspirating processes or pressure compacting there should be obtained a semi-finished member which, after the oxidation, affords a sufficient cohesion through mutual through-growth of the oxide layers of contacting granules.

As carrier there serves a permeable frameworkforming support structure which, preferably, consists of the same metal as the powder granules which are to be compacted in particular a lattice or sieve support with a mesh size of maximally a few hundred μm and, in essence, preferably a support of wire mesh with mesh size (approximately 200 μm) which prevents a "pancaking" of the thereby encompassed powder layers. Mesh supports with mesh sizes of up to 250 μm and 350 μm wire thickness were experimentally successfully utilized.

The support is anoxidized during the subsequent oxidation of the compacted powder layer and can finally (for the purpose of contacting) partially be freed from adhering oxide and serve as a current distributor. The oxidation is suitably effected in air at temperatures of about 1000° C., since at these temperatures within bearable periods of between a few 10 minutes there can be attained a sufficient oxidation of the powder layers. Temperatures of above 1000° C. merely operate more expensively and are therefore not preferred. Below 1000° C. an oxidation is naturally possible with a corresponding demand on time.

Of particular advantage are relatively thin diaphragms of minimally about 10 μm thickness which are fully oxidized on and can be safely operated for a few 1000 hours without the danger of shortcircuited. Currently, these are preferred membrane thicknesses of about 150 μm which are particularly resistant to failure, are well oxidized throughout and are gas-impermeable. The oxidation could be carried out to such an extent that the layer which is oxidized on is utilizable as a diaphragm which is not electron conductive. Suitably, there is effectuated therefore the oxidation up resistance values of at least a few 100 $\Omega/cm^2$, and preferably of about 100 k$\Omega/cm^2$.

The inventive diaphragms are especially suited for electrolytic cells with porous electrodes fixed thereon in a sandwich construction, which are preferably produced through galvanic deposition of nickel/zinc and the removal therefrom of zinc.

BRIEF DESCRIPTION OF THE DRAWINGS

Hereinbelow the invention is elucidated on the basis of the following detailed description of examples, taken in conjunction with the accompanying drawings; in which.

DETAILED DESCRIPTION

EXAMPLE 1

Poured into a pressing form is INCO-nickel powder Type 255 which is slurried in acetone, with a median particle sized of 2.3 to 3.0 μm and a maximum grain size of 10 to 15 μm, a pouring density of 0.50 to 0.65 g/cm$^3$ and a specific surface of 0.68 m$^2$/g for a layer thickness of 60 mgNi/cm$^2$. The surface of the thus obtained nickel layer was smoothed through shaking, and the acetone aspirated with blotting paper. After removal of the acetone residues there was applied a nickel mesh with a mesh size of 0.15 mm and a wire thickness of 0.20 mm and the entirety compressed at a compacting pressure of 200 kg/cm$^2$.

The thus mechanically stabilized semi-finished member was removed from the form and oxidized in air at 1000° for 30 minutes, and thereby there was obtained a diaphragm member suitable to be built into an electrolytic cell. The NiO layer thickness consisted of 0.15 mm, and the specific electrical surface resistance in 7 M KOH at room temperature consisted of 0.13 $\Omega cm^2$. These values are throughout comparable with those of presintered NiO diaphragms, similarly the low corrosive erosion in hot KOH and excellent separation effect for the two product gases, hydrogen and oxygen.

Figure 1:
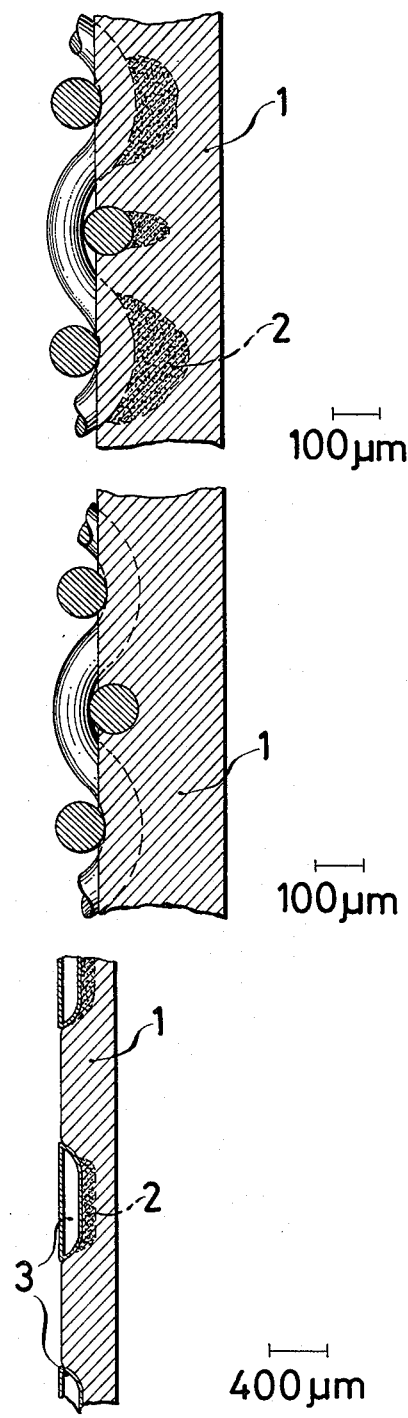
FIGS. 1a to 1c diagrammatically illustrate cross-sections of diaphragms.

FIG. 1a diagrammatically illustrates the fully metal-free NiO layer 1 obtained in accordance with the inventive process. A presintered diaphragm (FIG. 1b), in contrast therewith, after the same oxidation still contains residual metal areas 2 which, under circumstances, can lead to electrical shortcircuits. In order to obtain a pure NiO structure similar to that of FIG. 1a, a sintered semi-finished member require either substantially longer oxidation periods or a higher oxidation temperature of about 1200° C.

EXAMPLE 2

Example 1 was repeated under the same conditions, however, utilized as the supporting frame work was a VECO nickel sheet metal sieve where the sheet thickness of 0.2 mm (60% free surface). As illustrated in FIG. 1c, produced at locations which are adjacent to the sieve surfaces 3 of the support was nickel oxide 1 still having residual metal areas 2. However, the locations which apparently were not so extensively compacted by the pressure sequency and which were freely accesible to oxygen, are free from metal.

EXAMPLE 3

Figure 2:
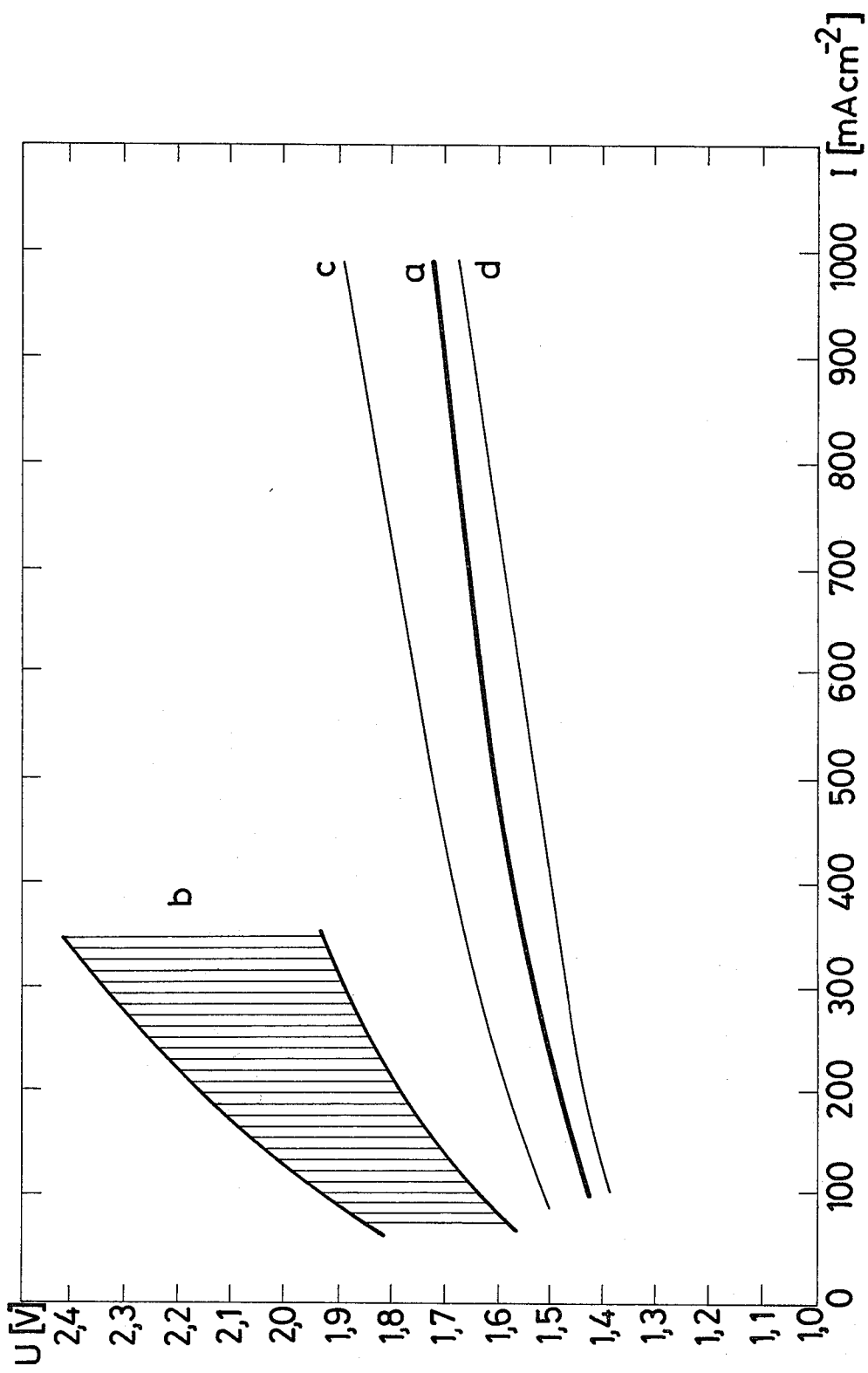
FIG. 2 illustrates current-voltage graphs for different types of diaphragms.

A diaphragm as produced in Example 1 was galvanically provided on both sides thereof with Ni/Zns alloy in electrode form as described by the applicant in German Patent Application P No. 29 14 094.1. After the activation, there was obtained a compact unit for the water electrolysis, which was tested at 100° C. in 40% KOH and delivered the current-voltage curve in a reproducible manner as shown in FIG. 2. For comparison, there is illustrated in FIG. 2 the region b for the conventional water electrolysis. The curve c corresponds to a advanced alkaline water electrolysis at 120° C. with activated electrodes (Cathode: NiCo$_2$S$_4$, Anode: NiCo$_2$O$_4$, compare: H. Vandenborre et al., Status Seminar "Hydrogen as Energy Vector", Comm. Europ. Comm. 13-14. February 1980, Brussels, page 143). The curve d again reflects the latest results of the company General Electric with the so-called SPE electrolysis (J. H. Russel: Hydrogen Energy Progress, Proc. 3rd World Hydrog. Energy Conf., 23-26 June 1980, Tokyo, pages 3-13). This curve was obtained at 115° C.

As one can ascertain, the inventive manner of operation is merely somewhat exceeded by the SPE electrolysis which, however, requires essentially more expensive diaphragm and electrode materials than the inventive alkaline water electrolysis. From this comparison with the latest state of the technology, there can be particularly clearly ascertained the advantages of the inventively produced diaphragm.

What is claimed is:

1. Porous oxide diaphragm for alkaline electrolysis, particularly water electrolysis; including a permeable frameworkforming support; and a matrix of an oxidized thereon layer formed by oxidized on metal powder particles united and fixed by mutually penetrating oxide layers formed through oxidation in situ.

2. Diaphragm as claimed in claim 1, said oxidized on layer being obtained from a metal powder layer formed through cold compacting of metal powder.

3. Diaphragm as claimed in claim 2, said metal powder layer being obtained through cold pressing under pressures in the range of 0.01 to 20 t/cm$^2$.

4. Diaphragm as claimed in claim 3, said pressure being in the range of 0.1 to 1.0 t/cm$^2$.

5. Diaphragm as claimed in claim 1, said metal powder layer being obtained from a powder having a median grain size of 0.5 to 10 μm.

6. Diaphragm as claimed in claim 1, said metal powder layer being selected of material selected from the group consisting of Ni, Fe and Cu.

7. Diaphragm as claimed in claim 1, said support being a mesh or sieve support structure having a mesh size of maximally a few hundred μm, said metal powder layer being formed on said support.

8. Diaphragm as claimed in claim 1, said metal powder layer being substantially fully oxidized onto said support.

9. Diaphragm as claimed in claim 1, said oxidized on layer having a thickness of about 10 to 500 μm.

10. Diaphragm as claimed in claim 9, said layer having a thickness of about 100 to 150 μm.

11. A process for the production of a diaphragm for alkaline electrolysis, particularly water electrolysis, comprising the steps of: applying a metal powder slurried in a volatile medium onto a permeable, framework-forming support, separating out the volatile medium; compacting the metal powder under pressure to a predetermined extent so that at a subsequent oxidation there is achieved a mechanical adherence of the layer sufficient for the purpose of application through mutual through-growth of the oxide layers of the contacting granules; and oxidizing on the thereby formed semi-finished member at an elevated temperature of about 1000° C. in an oxygen-containing gas.

12. Diaphragm as claimed in claim 1, for use with electrolytic cells, particularly porous electrodes fixed thereon on a saidwich-like manner through galvanic deposition of nickel and zinc and removal of zinc to produce active nickel electrodes.

* * * * *